United States Patent [19]
Perego

[11] 3,883,149
[45] May 13, 1975

[54] BABY CARRIAGE FRAME

[75] Inventor: Gianluca Perego, Arcore, Italy
[73] Assignee: Perego-Pines S.p.A., Italy
[22] Filed: July 22, 1974
[21] Appl. No.: 490,259

[30] Foreign Application Priority Data
  Mar. 7, 1974  Italy.................................. 35639/74

[52] U.S. Cl................................................ 280/36 B
[51] Int. Cl................................................ B62b 3/02
[58] Field of Search ......... 280/36 B, 39, 41 A, 41 B

[56] References Cited
UNITED STATES PATENTS

| | | | |
|---|---|---|---|
| 2,210,071 | 8/1940 | Feldmam............................ | 280/36 B |
| 2,744,760 | 5/1956 | Welsh................................. | 280/36 B |
| 3,173,704 | 3/1965 | Boudreau........................... | 280/36 B |
| 3,330,575 | 7/1967 | Boudreau........................... | 280/36 B |
| 3,411,799 | 11/1968 | Felsher............................... | 280/36 B |
| 3,627,342 | 12/1971 | Morellet............................. | 280/36 B |

*Primary Examiner*—Robert R. Song
*Attorney, Agent, or Firm*—McGlew and Tuttle

[57] ABSTRACT

A collapsible baby carriage frame assembly comprises an upper frame including wheels and a lower frame including brakes. The upper frame comprises a crossbar structure of the type of lazy tongs supporting the baby cabin and provided with a foldable handle bar and a spring tube structure resiliently supporting the crossbar structure and carrying wheels mounted on spindles projecting toward the interior. The lower frame comprises longitudinal members carrying a braking device and connecting two wheel axles having axial bores into which the spindles of the wheels are engageable. The upper frame is held assembled with the lower frame by means of hooks provided on the latter. The crossbar structure is connected to the spring tube structure by connection clevises extending longitudinally of both structures and acting as swivels so that the respective connected bar and tube ends are positively spaced apart but can be turned axially whereby the members of the spring tube structure, along with the wheels, may be folded toward the crossbar structure which, in its turn, is collapsible together with the handle bar. The lower frame is also foldable about a pivot connection.

6 Claims, 10 Drawing Figures

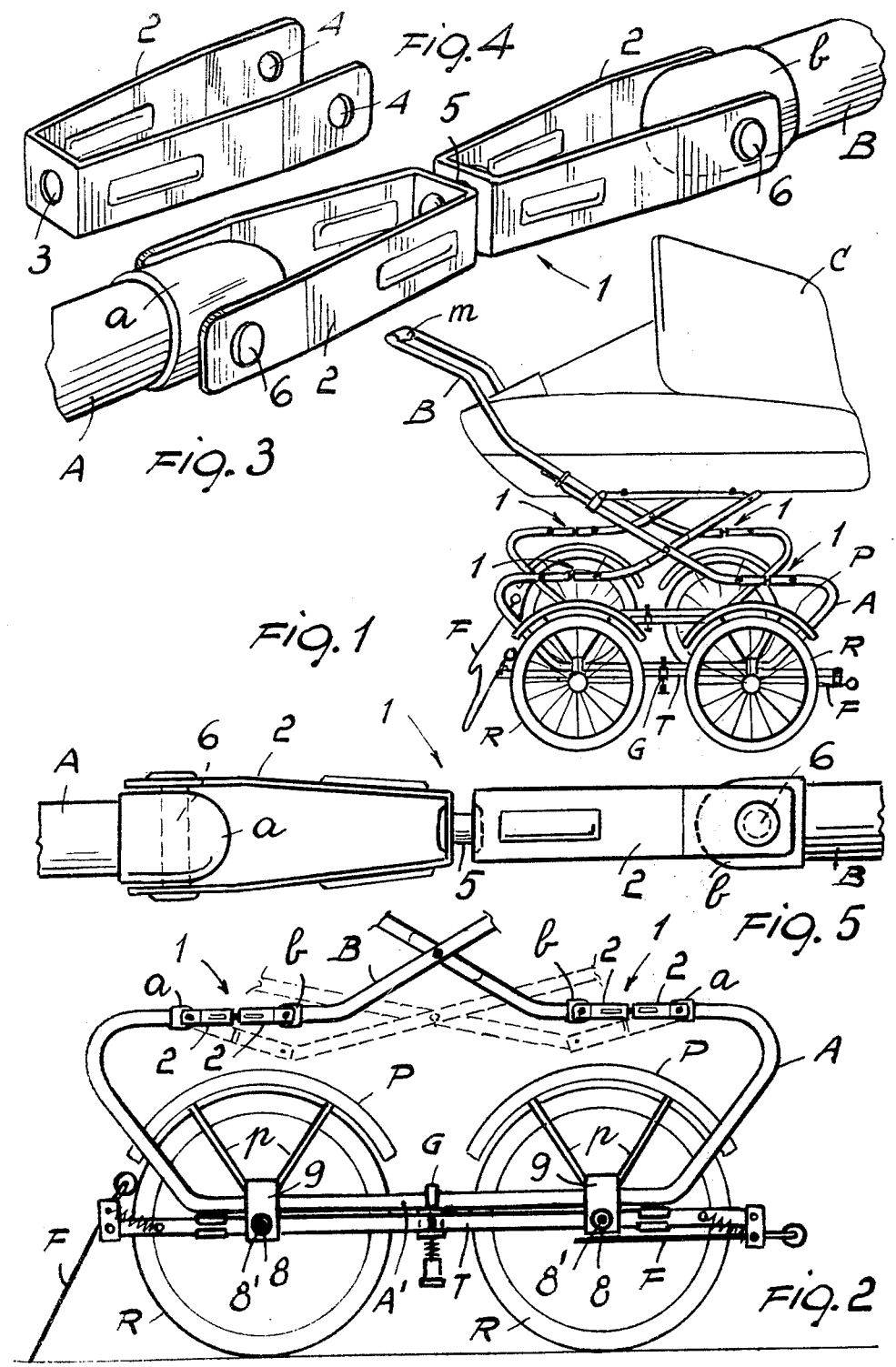

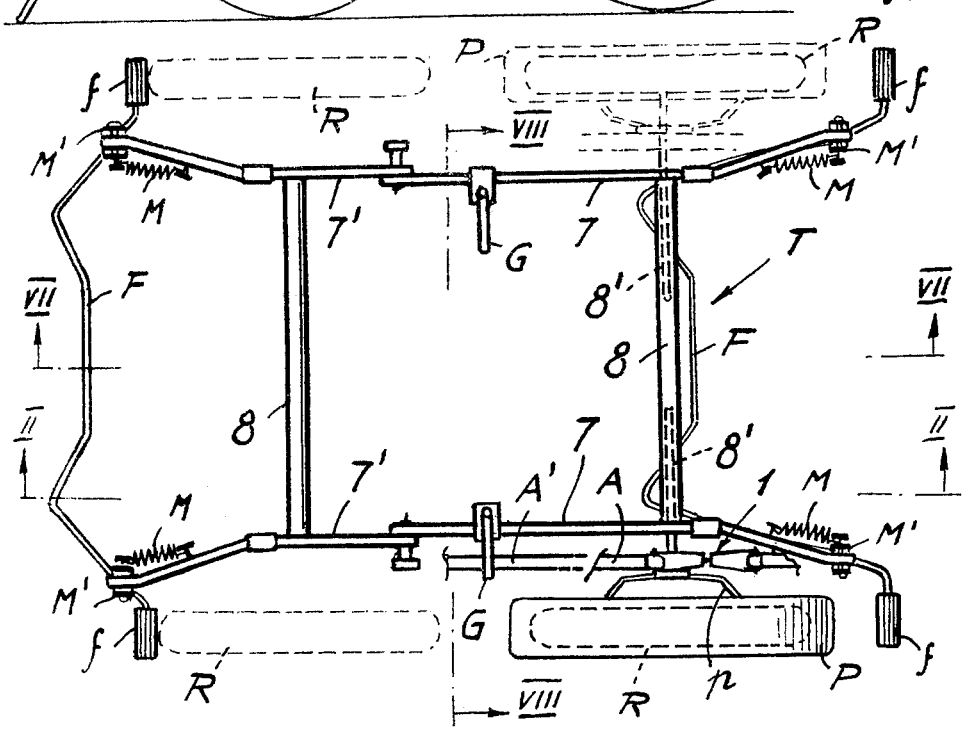
Fig. 7
Fig. 6
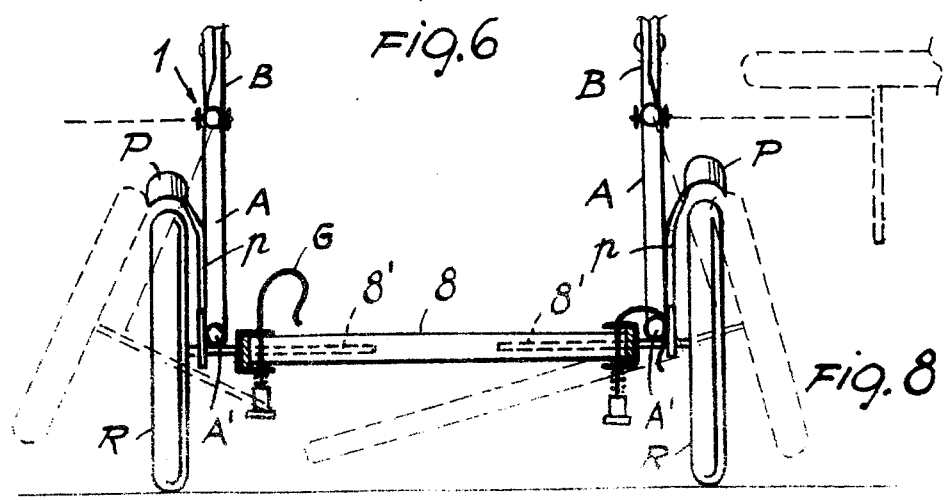
Fig. 8

BABY CARRIAGE FRAME

BACKGROUND OF THE INVENTION

1. Field of the Invention

The present invention relates in general to baby carriages and, in particular, to a new and useful construction of a collapsible frame assembly for supporting a baby cabin, which can be disassembled into an upper frame and a lower frame and both these parts can further be folded to occupy a very small space while assuring that no member of the structure is damaged by pressure against other members.

2. Description of the Prior Art

There are several types of known supporting frames for baby carriages, many of which are designed as structures capable of being disassembled into parts and/or collapsed to facilitate their packing, storage, and shipment by reducing their volume to a smallest possible space. However, in many cases, it has been found that a reassembling of such collapsed parts is very difficult and, what is worse, that during handling or shipment, the parts and their members are subjected to deformations by accidental shockes or by compression due to stresses to which they are exposed, which particularly applies to resilient tube elements. Such deformations are chiefly due to the fact that in the prior art, connections of frame structures are effected by means of hooks or rings or several joined rings, or even by belts only. The present invention is directed primarily to the prevention of such damages.

SUMMARY OF THE INVENTION

In accordance with the present invention, there is provided an improved carriage frame assembly comprising two parts which can easily be joined to or disjoined from each other and which, in their turn, can be collapsed in a manner ensuring that no member of any part of the whole assembly is deformed under conditions of handling or shipment.

To this end, one part of the frame assembly is designed as an upper structure or frame including wheels, and the other part is designed as a lower frame including the wheel axles and brakes. The upper frame comprises a crossbar structure and is made foldable in the vertical direction by providing pivot joints and a supporting spring tube structure is made foldable in the horizontal direction by providing swivel connections between the respective end portions of the structures extending in the longitudinal direction of the carriage.

For assembling and disassembling the upper and lower frames easily and rapidly, the wheels are carried by the lower members of the upper frame and mounted on spindles which are engageable into axial bores provided in the wheel axles which form a part of the lower frame and locking means are provided on the lower frame for holding together the two frames. Moreover, the lower frame is foldable in its length.

Accordingly, it is an object of the invention to provide a collapsible baby carriage frame assembly comprising an upper frame including a crossbar structure, a handle bar, a spring element structure, and wheel means, a lower frame including wheel axles, connection members for the axles, and lock and brake means, means for foldably connecting the spring element structure to the crossbar structure, the handle bar to the crossbar structure, the members of this structure between them, and the front and rear part of the lower frame, and means for releasably connecting the upper frame to the lower frame.

Another object of the invention is to provide means for connecting the crossbar structure to the spring element structure comprising clevis elements joined to the respective lower and upper end portions of the concerned structure members and to each other for holding the structures firmly at a distance while permitting a lateral pivotal movement of the spring element members along with the wheels and a yielding adaptation of the connection to the collapsing of the upper frame.

A further object of the invention is to provide means for disengageably connecting the upper frame to the lower frame comprising wheel means which are mounted on the lower member of the upper frame and include spindles with wheels mounted thereon and engageable into axial bores provided in the wheel axles, and locking hooks mounted on the lower frame and engageable over the lower members of the upper frame to retain these members in the assembled position.

Still another object of the invention is to provide a collapsible baby carriage frame assembly which is simple in design, rugged in construction, economical to manufacture and easy to assemble and disassemble.

For an understanding of the principles of the invention, reference is made to the following description of a typical embodiment thereof as illustrated in the accompanying drawings.

BRIEF DESCRIPTION OF THE DRAWINGS

In the drawings:

FIG. 1 is a perspective view of a baby carriage comprising a collapsible frame assembly in accordance with the invention;

FIG. 2 is a lateral elevational view of one side of the lower part of the frame assembly shown in FIG. 1, taken along the line II—II of FIG. 6;

FIG. 3 is a perspective view of a clevis element used for connecting the crossbar structure to the spring element structure in accordance with the invention;

FIG. 4 is a perspective view of the connection between members of the crossbar structure and the spring element structure, comprising two clevis elements joined to each other and to the respective structural members;

FIG. 5 is a top plan view of the connection shown in FIG. 4 with one clevis element turned through 90°;

FIG. 6 is a top plan view of the lower frame in accordance with the invention, the wheel means in assembled position being indicated;

FIG. 7 is a lateral elevational view, partly in section, of one side of the lower frame taken along the line VII-—VII of FIG. 6 with indicated position of the wheels;

FIG. 8 is an end view, partly in section, of one side of the lower part of the frame assembly taken along the line VIII—VIII of FIG. 6 and indicating the disengagement of the wheels;

DESCRIPTION OF THE PREFERRED EMBODIMENT

Figure 10:
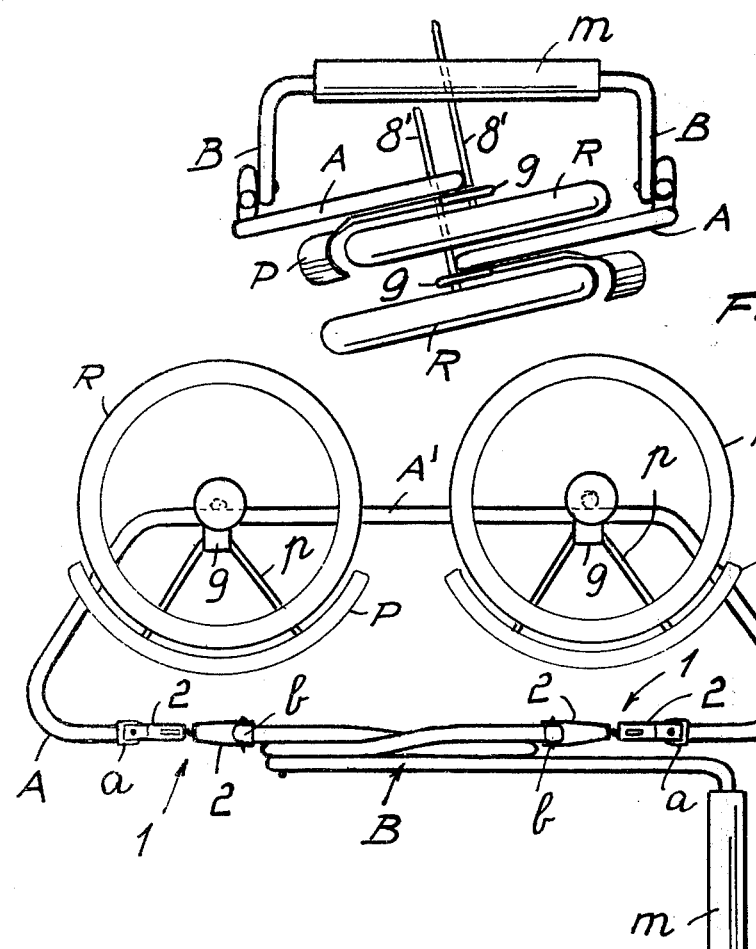
FIG. 10 is an end view of the completely collapsed upper frame shown in FIG. 9.

Referring to the drawings in particular, the invention embodied therein, comprises a collapsible baby carriage frame assembly. As shown in FIG. 1, the supporting structure or frame assembly of a baby carriage includes a crossbar structure, generally designated B, a supporting spring element structure, generally designated E, a lower frame T, and wheels R. The crossbar structure B is formed by crossbar members which are pivoted to each other at 10 and can be locked in their extended position to support a baby cabin C. The crossbar members extending toward the rear side of the carriage are extended by two legs of a handle bar H having a handle m. The handle bar H is usually pivoted to the crossbars (as may be seen in FIG. 9) and may be folded ahead or locked in its extended position. The lower extremities of the crossbars extending in the longitudinal direction of the carriage are connected by connection means 1, which will be described hereinafter, to oppositely projecting upper extremities of spring tube members A which have the function of springs and constitute the spring element structure E.

FIG. 2 shows one of the spring tube members A in an enlarged view and in an assembled state in which it is locked to lower frame T. The spring tube member A comprises a lower middle portion A' extending in the longitudinal direction of the carriage, on which the wheels R are mounted by means of spindles 8' projecting inwardly and straps 9 (cf. FIG. 8). Straps 9 also carry supporting bars p by which fenders P are rigidly held in spaced position relative to the wheels R.

The upper end portions of the spring tube members A, projecting in the longitudinal direction, are axially aligned with the corresponding lower end portions of the crossbars of the crossbar structure B and connected thereto by connection means, generally designated 1. For this purpose, both the lower end portions of the crossbars and the upper end portions of the spring tube members A are formed with rounded ends a and b, respectively, as shown in FIG. 3. The connection means 1 comprise two clevis elements 2 which are pivotally connected by their legs to the rounded ends a or b by means of studs 6 passed through holes 4 and further connected to each other by means of studs 5 passed through holes 3 which are provided in the web portion of the elements 2. Thus, the connection ensures a definite spacement of the two connected end portions and thereby of the crossbar structure B from the spring element structure E preventing any mutual deformation of the bars or tubes. The connection 1 also yields to the mutual displacement of the connected bars and tubes during the folding of the crossbar structure B as indicated in FIG. 2 and, mainly, permits a lateral pivotal motion and thereby folding of the spring tube members A toward the folded crossbar structure B, as may best be seen in FIGS. 9 and 10.

FIG. 5 shows the connection means 1 in such a position in which the clevis element 2 mounted on one of the end portions is turned through 90° relative to the clevis element 2 mounted on the other end portion.

Lower frame T is illustrated in FIGS. 6, 7 and 8. It comprises longitudinal connection members each including two connection bars 7 and 7' which are pivoted to each other at 11 and can be locked in their extended position. Wheel axles 8 extend between and are secured to the connection bars 7 and 7', respectively. The wheel axles 8 are provided with axial bores adapted to receive the spindles 8' of the wheels R. The connection bars 7' along with the respective wheel axle 8 are foldable relative to the connection bars 7 about the pivots 11, as indicated in FIG. 7. A hook G mounted on each of the connection bars 7 by means of a bracket and biased by a spring is engageable over the lower middle portion A' of the spring tube member A and may be secured in its position by a lock pin (not shown). Thereby, the assembled position of the wheels and the upper frame is secured.

FIGS. 6 and 7 further show lock or brake means by which the lower frame T and wheels R, in assembled state, may be held in position relative to a supporting surface. The free extremities of connection bars 7 and 7' carry brackets M' which are pivoted thereto and have a free end. By these outer ends, the brackets are biased by tension springs M which are attached, by their other ends, to the respective connection bar 7 or 7'. An M-shaped brake lever F having laterally outwardly projecting end portions carrying brake members f is mounted on the free ends of brackets M' so that the lever end portions carrying brake members f extend beyond the brackets toward the wheels R to cooperate with the latter. The middle portion of the brake lever F is shaped so as to apply against the supporting surface under a certain angle at which the brake member f is applied against wheel R. By turning the brake lever F with the bracket M about the pivot of the bracket, the lever F may be pivoted through 180° to occupy an inoperative rest position, as shown in FIG. 7, at the righthand side.

Figure 9:
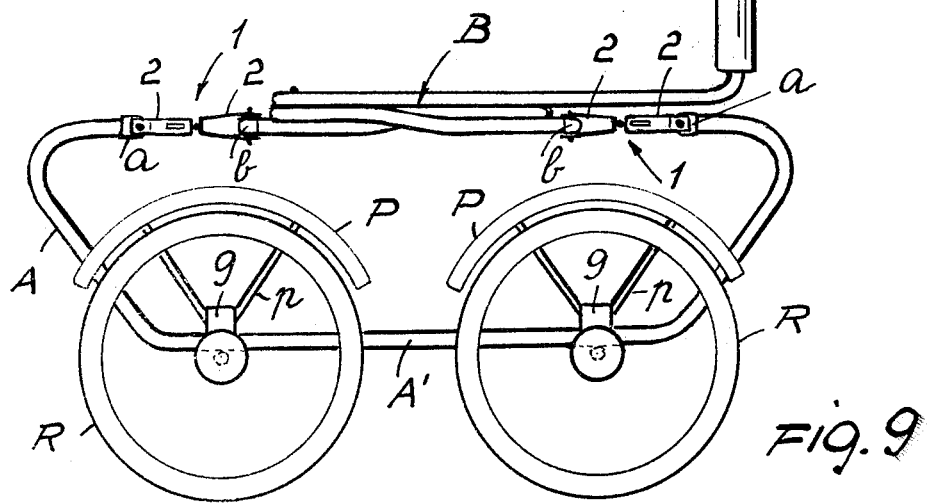
FIG. 9 is a top plan view of the upper frame in accordance with the invention shown in unfolded position, but with the hand bar folded.

FIG. 9 shows the upper frame in an unfolded position upon disengagement from the lower frame T. After being collapsed, the upper frame is reduced to a very small space and occupies the position shown in FIG. 10.

While a specific embodiment of the invention has been shown and described in detail to illustrate the application of the principles of the invention, it will be understood that the invention may be embodied otherwise without departing from such principles.

What is claimed is:

1. A collapsible baby carriage frame assembly, comprising an upper frame and including a crossbar structure comprising two spaced apart front crossbars extending obliquely upwardly of the longitudinal direction of the carriage and two spread apart rear crossbars extending adjacent said front crossbars and crossing the same at an angle symmetrical of said longitudinal direction, said front and rear crossbars extending to common upper and lower levels and being pivoted to each other at their cross-points and thereby adapted to be folded and to be unfolded and locked to serve as a support for a baby cabin and each crossbar having obliquely extending upper end portions and lower end portions extending in said longitudinal direction of the carriage; a handle bar having a handle portion and two spaced apart legs adapted to form extensions of said rear crossbars and having each a free end portion pivotally connected to the respective one of said upper end portions of said rear crossbars, the pivots defining an axis transverse to said longitudinal direction about which said handle bar is foldable toward said front crossbars; a spring element structure supporting said crossbar structure and comprising two spaced apart spring tube members of upwardly open bracket-like configuration and extending, in assembled state, in vertical alignment with the respective crossbars, each of said spring tube members having two free end portions projecting inwardly in said longitudinal direction and axially aligned with the respective lower end portions of said crossbars and a lower middle portion extending in the same direction; and means for yieldably connecting said lower end portions of said crossbars to said upper end portions of said spring tube members in a definite spaced relationship while permitting their mutual rotation about their longitudinal axes to enable said spring tube members to be folded toward said crossbar structure; a lower frame including two spaced apart connection members extending in said longitudinal direction and, in assembled state, adjacent said lower middle portions of said spring tube members; two spaced apart wheel axles extending between and secured to said connection members; and means for locking said lower frame in position on a supporting surface, each of said connection members comprising a front connection bar having an outer and an inner end and being secured to one of said wheel axles, and a rear connection bar having an outer and an inner end and being secured to the other wheel axle, said inner ends of said front and rear connection bars of each connection member being pivoted to each other in the space between said axles and said pivots defining an axis which is parallel to said axles and about which said rear connection bars along with the respective axle are pivotable relative to said front connection bars to fold said lower frame; wheel means mounted by twos on each of said lower middle portion of said spring tube members in spaced relationship corresponding to the spacement of said wheel axles; and means for mutually engaging and locking said wheel means to said lower frame in assembled state and unlocking and disengaging the same while collapsing said frame assembly.

2. A collapsible baby carriage frame assembly, according to claim 1, wherein said lower end portions of said crossbars and said upper end portions of said spring tube members are formed with rounded ends and said means for yieldably connecting said end portions comprise each two clevis elements, each of said clevis elements being formed with a web portion and two spaced apart legs having free ends and defining the longitudinal direction of said elements, said free leg ends of one of said clevis elements being pivotally joined to said rounded end of a crossbar and said free leg ends of the other clevis element being pivotally joined to said rounded end of a spring tube member and the two clevis elements being joined to each other by their web portions and aligned in their longitudinal direction by means of a stud passed through said web portions.

3. A collapsible baby carriage frame assembly, according to claim 1, wherein said wheel means comprise each a spindle, a wheel mounted thereon, a fender located in a spaced position relative to said wheel, and a supporting structure holding said fender in its spaced position.

4. A collapsible baby carriage frame assembly, according to claim 1, wherein said means for engaging and locking said wheel means comprises said wheel axles formed with axial bores, said wheel means comprising spindles engageable into said bores and with wheels mounted thereon, and hook means for disengageably holding together said lower middle portions of said spring tube members and said connection members of said lower frame.

5. A collapsible baby carriage frame assembly, according to claim 4, wherein said hook means comprise spring-biased hooks provided with lock pins, each hook being mounted on one of said connection members of said lower frame at a location between said wheel axles and engageable over said lower middle portions of said spring tube members.

6. A collapsible baby carriage frame assembly, according to claim 1, wherein said means for locking said lower frame in position comprises brackets mounted for pivotal movement on each of said outer ends of said connection bars and having free ends which are biased by tension springs attached to said connection bars and an M-shaped brake lever having a middle portion and laterally outwardly projecting free end portions and mounted on said free ends of said brackets so that its free end portions extend to one side and its middle portion to the other side of said brackets, and brake members mounted on said free end portions of said brake lever for engaging said wheel means, said brake lever being pivotable through 180° from an operative position in which it is braced against a supporting surface and braking said wheel means and an inoperative rest position in which it is retained toward said lower frame.

* * * * *